United States Patent [19]

Tsukamoto

[11] 4,146,236
[45] Mar. 27, 1979

[54] COUNTERWEIGHT FOR A TONEARM

[76] Inventor: Kenkichi Tsukamoto, 47, Koyamashimofusa-cho, Kita-ku, Kyoto-shi, Kyoto-fu, Japan

[21] Appl. No.: 853,604

[22] Filed: Nov. 21, 1977

[30] Foreign Application Priority Data

Nov. 30, 1976 [JP] Japan .............................. 51-143622

[51] Int. Cl.² .............................................. G11B 3/10
[52] U.S. Cl. ................................................ 274/23 R
[58] Field of Search ....................................... 274/23 R

[56] References Cited

U.S. PATENT DOCUMENTS 4,079,943  3/1978  Morita et al. ...................... 274/23 R Primary Examiner—Charles E. Phillips
Attorney, Agent, or Firm—Ladas, Parry, Von Gehr, Goldsmith & Deschamps

[57] ABSTRACT

A counterweight supported on the tone arm of the record player in which a weight member making an inertial motion is movably incorporated so as to apply a damping resistance to the tone arm.

5 Claims, 8 Drawing Figures

COUNTERWEIGHT FOR A TONEARM

BACKGROUND OF THE INVENTION

This invention relates to a counterweight for making a static balance with the cartridge of an tone arm in a record player.

In general, as for a resonance due to the combination of the equivalent masses (several tens of grams to one hundred and several tens of grams) in horizontal movement and in vertical movement of the tone arm, a damping resistance sufficient to damp the resonance does not exist in the cartridge, and therefore this damping resistance should be provided in the tone arm. This could be understood from the fact that the damping resistance of the cartridge mainly depending on the damper rubber can merely damp a vibrator or a cantilever whose effective mass is of the order of one milligram, and there is a difference close to a hundred-thousand-fold between the effective mass of the cartridge and that of the tone arm, and accordingly the damping resistance of the cartridge is out of the question for damping the motion of the tone arm. And no suitable means for damping the tone arm has been proposed yet.

SUMMARY OF THE INVENTION

In view of the foregoing, it is an object of this invention to provide a counterweight which can apply a damping resistance to all kinds of tone arm in a simple method.

The foregoing object and other objects of the invention have been achieved by providing a counterweight comprising a casing supported on a tone arm, and a weight member movably supported in the casing, a viscous semifluid oil being interposed between a portion of the casing and a portion of the weight member which are allowed to slide along each other, the motion of the tone arm being damped by an inertial motion of the weight member caused by the motion of the tone arm.

The nature, utility and principle of the invention will be more clearly understood from the following detailed description and the appended claims when read with reference to the accompanying drawings, in which like parts are designated by like reference numerals or characters.

DETAILED DESCRIPTION OF THE INVENTION

Figure 1:
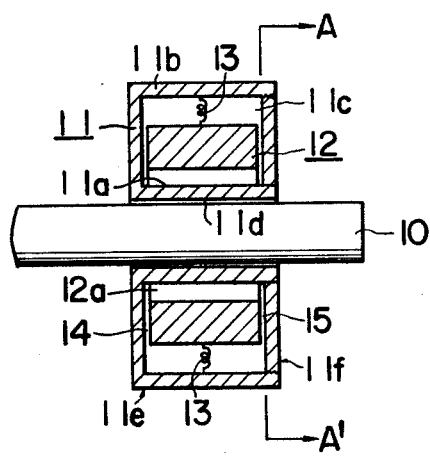
FIG. 1 is a sectional view showing one example of a counterweight according to this invention.

Shown in FIG. 1 is a first example of a counterweight according to this invention which is placed over a tone arm. The tone arm 10 may be in the form of a hollow pipe or a cylindrical solid bar, or in the form of a prism (instead of a cylinder), or may be anything if it serves as a part of the tone arm supporting the counterweight.

The tone arm 10 is inserted through a hole 11d of a casing 11. The casing 11 itself is in the form of a hollow cylinder having coaxially arranged side walls 11a and 11b. The outer surface of the side wall 11a forming the hole 11d is in close contact with the tone arm 10 to the extent that the weight control of the tone arm can be effected. This casing can be obtained by screwing a cover 11f into a cup-shaped body 11e having the through-hole 11e at the central portion.

Figure 2:
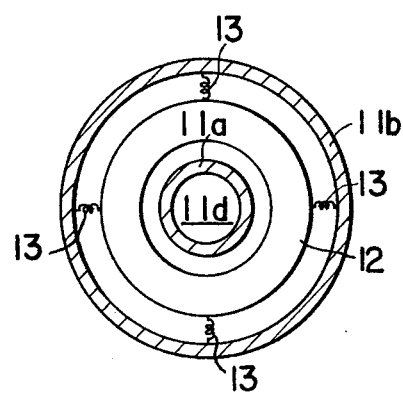
FIG. 2 is a front view illustrating the counter weight shown in FIG. 1.

A weight member 12 as shown in FIG. 2 is provided in the cavity 11c of the casing 11 in such a manner that it is elastically supported on the side wall 11b through springs 13 which are attached to either the weight or the casing or both. As is apparent from FIG. 2, the weight member 12 is annular, and the diameter of the central hole 12a of the weight member 12 is somewhat larger than the outside diameter of the inside wall 11a. Accordingly, the weight member 12 is movable to an extent. Thus, the tone arm 10, the casing 11, and the weight member 11 are arranged coaxially, and the weight member can vibrate elastically. In this connection, it goes without saying that the sum of the weight of the casing 11 and the weight of the weight member 12 is made to be heavy enough to keep a static balance with the weight of the cartridge.

Furthermore, according to this invention, an oil which is viscous semi-fluid is interposed in the gaps 14 and 15 defined by the casing 11 and the weight member 12 so as to control the motion of the weight member. If necessary, the cavity 11c of the casing 11 may be filled with the aforementioned oil. The visous semi-fluid oil is an oil which, being of a semi-solid, does not flow to make a substantially fixed resistance to the motion of a substance.

When the vibration of the tone arm is lower than the resonance frequency of the vibration system consisting of the springs 13 and the weight member 12, the weight member 12 is substantially at rest with respect to the casing 11. However, when the vibration of the tone arm is higher than the resonance frequency, the weight member 12 cannot follow the motion of the tone arm, as a result of which the inertial force of the weight member 12 is applied to the tone arm, thereby to damp the motion of the tone arm.

As is apparent from the above description, all that is required for the weight member 12 is to apply its inertial force to the motion of the tone arm. Therefore, it is not necessary for the weight member 12 to have an annular shape so as to be placed over the tone arm 10 at all. In addition, the requirements for the casing 11 are that it can movably support the weight member 12 and can be supported on the tone arm 10. Therefore, it is not always necessary that it is in the form of a case in which the weight member 12 is incorporated, and that the shape of the casing is cylindrical. For the same reason, without employing the springs 13, magnets equal in polarity or opposite in polarity may be provided on the casing 11 and the weight member 12 at the positions where the springs 13 were.

Figure 8:
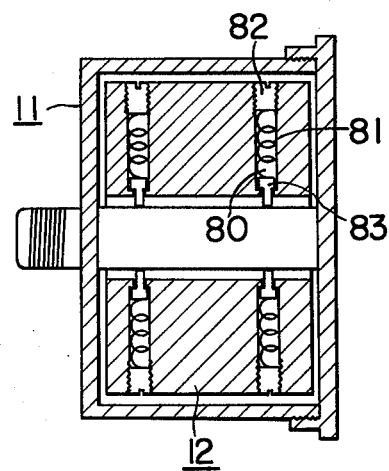

In the example described above, the springs 13 or the magnets are provided between the outer periphery of the weight member 12 and the outer side wall 11b of the casing 11; however, the same effect can be obtained by providing the springs or the magnets between the inner periphery of the weight member 12 and the inner side wall 11a of the casing 11. An example of the counterweight of this type is shown in FIG. 8. In this example, a plurality of through-holes 80 are radially provided in the weight member 12. In each of the through-holes 80 a spring 81 is inserted. The spring 81 is depressed by screwing a screw 82 into the through-hole 80 so that the elastic force of the spring 81 is applied toward the central through-hole 12a through a pin 83 made of, for instance, plastic.

In the above-described examples of the counterweight according to the invention, the elastic support members are installed separately between the casing and the weight 12. The elastic support members for holding the weight 12 inside the casing 11 instead of being in the form of the helical spring 13 shown in FIGS. 2 and 8, can be in the form of a leaf spring.

Figure 6:
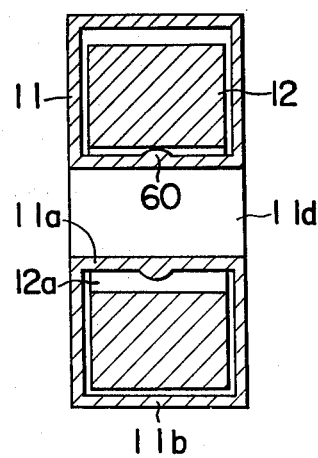
FIGS. 6 through 8 are explanatory diagrams showing modifications of the counterweight according to the invention.
Figure 7:
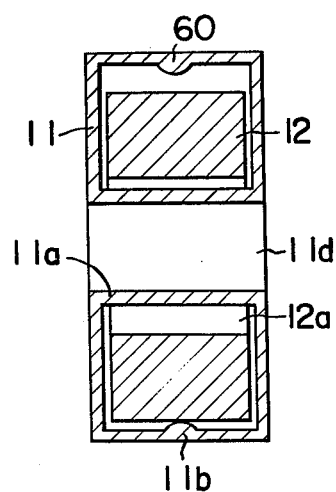

Since the weight member 12 should be movably supported so as to have an inertial motion, it is not always necessary to elastically support the weight member as is seen from FIG. 6. More specifically, an annular protrusion 60 is formed on the internal surface of the inner wall 11a of the casing 11, or protrusions 60 are formed, at intervals, on the internal surface of the inner wall 11a of the casing 11 so that the weight member 12 is allowed to abut against the protrusion or protrusions 60 with the aid of the gravity. In this connection, if the diameter of the central through-hole 12a of the weight member 12 is made somewhat larger than the diameter of the inner wall 11a so that the weight member can move laterally, the same effect can be obtained. In this example, the weight member 12 cannot move vertically; rather than in a vertical plane. The aforementioned protrusions 60 may be formed on the internal surface of the outer wall 11a of the casing 11 instead of the inner wall 11b as shown in FIG. 7. Furthermore, the protrusion 60 may be formed integrally with the casing as was described; however, it may be formed by fixing elastic or non-elastic pieces on the casing 11 after it has been manufactured.

Figure 3:
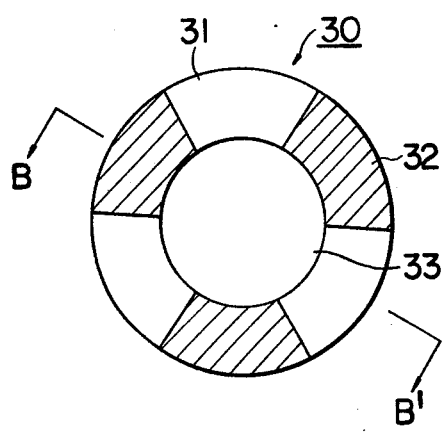
FIG. 3 is a diagram illustrating an essential component of the counterweight according to the invention.
Figure 4:
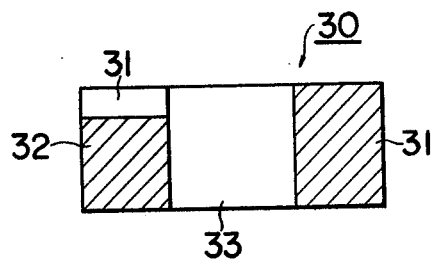
FIG. 4 is a sectional view taken along line B-B' in FIG. 3.

Another example of the weight member is shown in FIG. 3. This weight member 30 is an annular member having a through-hole at the central portion into which the tone arm is inserted. The annular member 30 is equally divided into six sector portions 31 and 32 which are on different levels or thickness alternately. As shown in FIG. 4, the level of the portion 32 is lower than that of the portion 31. In this connection, if one surface of the casing confronting the weight member 30 is formed to have a shape similar to that of the surface of the weight member 30 and to be rotatable with respect to the weight member 30, the contact area and/or contact distance between the weight member 30 and the casing wall can be changed. The space or gap between the weight member and the inside of the casing being filled with oil, there is a certain amount of frictional or slide resistance set up when the weight member moves relative to the casing. This resistance is greater when the gap is narrow. Accordingly, the inertial force for damping can be controlled by changing the frictional resistance between the weight member 30 and the casing wall. For instance, if the inner surface of the cover 11f for the casing 11 is formed to have a shape similar to the shape formed on the surface of the weight member 30, both of the contact area and contact distance between the weight member 30 and the casing 11 can be changed by screwing or unscrewing the cover 11f.

The shapes of the confronting surfaces of the weight member 30 and the casing are not limited to that shown in FIG. 3; that is, the confronting surfaces may have any shape if it can change the contact area and contact distance between the weight member 30 and the casing. Furthermore, the weight member 12 may be so designed as to be rotatable.

Figure 5:
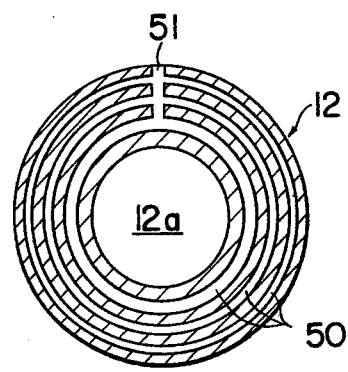
FIG. 5 is a diagram showing essential components of the counterweight according to the invention.

Another example of the weight member according to the invention is shown in FIG. 5, in which slits 50 is coaxially provided in the surface of the weight member 12 which slides along the casing 11. The slits 50 are communicated with one another and the atmosphere through a thin passage 51. A viscous semi-fluid oil is supplied into the slits 50. In the weight member thus constructed, the oil is suitably supplied through the slits, and therefore necessary lubrication can be obtained at all times, and in addition the damping resistance can be controlled suitably. The passage 51 may be a thin hole penetrating the weight member 12 or may be a thin groove provided in the surface of the weight member 12. All that is necessary for the passage 51 is to communicate with all of the slits and with the atmosphere. The slits 50 may be provided in only one of the two sides of the weight member which slide along the casing 11, or in the two sides thereof. In the above-described example, the slits 50 are cut coaxially; however, it should be noted that this is not limitative. That is, the slits may be formed at any positions if the slits are substantially in parallel with one another. For instance, the slits may be provided in the protruded portions 31 only of the weight member 31 shown in FIG. 3.

As is apparent from the above description, according to this invention, the weight member making an inertial motion is movably supported in the counter weight, thereby to provide a counter weight capable of applying a damping resistance to any kind of tone arm in a simple manner. In other words, if a tone arm in which means for effecting the compliance of the cartridge and the damping against a tone arm motion is not provided employs the counter weight according to the invention, the aforementioned vibration system can be readily damped.

What is claimed is:
1. A counterweight for a record player tone arm which comprises: a casing slidably supported on the tone arm; a weight member movably supported in said casing, viscous semi-fluid oil being interposed between a portion of said casing and a portion of said weight member so that the weight is free to move relative to the casing, the motion of the tone arm being damped inertially by said weight member.

2. A counterweight as claimed in claim 1, wherein the casing is in the form of a hollow cylinder, the weight member is annular and is arranged coaxially within the casing, and elastic support means selected from the group consisting of springs or magnets is arranged inside the casing.

3. A counterweight as claimed in claim 2, wherein the annular weight member is equally divided into a plurality of sectors alternating in thickness, at least one inside surface of the casing is formed with a similar shape, and one side of the casing can be screwed or unscrewed so as to adjust the distance between weight member and casing.

4. A counterweight as claimed in claim 2, wherein the annular weight member is coaxially provided with slits in its surface in contact with the casing wall, the slits communicating with each other and the atmosphere.

5. A counterweight as claimed in claim 1, wherein the casing is in the form of a hollow cylinder and the weight member is annular and is arranged coaxially with the casing and at least one annular portion formed on the casing member maintain a gap adapted to be filled with oil between said casing and said weight member.

* * * * *